Figure 1:
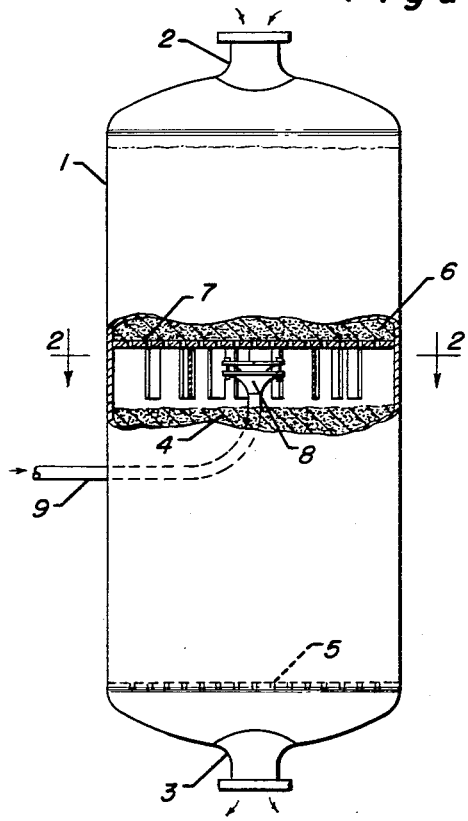

Aug. 4, 1964   J. F. WALTER   3,143,581

LIQUID DISTRIBUTING APPARATUS

Filed Jan. 2, 1962

INVENTOR:
John F. Walter

BY: Chester J. Giuliani
Philip T. Liggett
ATTORNEYS

United States Patent Office 3,143,581
Patented Aug. 4, 1964

3,143,581
LIQUID DISTRIBUTING APPARATUS
John F. Walter, Clarendon Hills, Ill., assignor to Universal Oil Products Company, Des Plaines, Ill., a corporation of Delaware
Filed Jan. 2, 1962, Ser. No. 163,662
1 Claim. (Cl. 261—97)

The present invention relates to means for effecting a uniform distribution of a liquid stream to a contact bed in a mixed liquid-vapor system and more specifically to an improved apparatus design and construction providing specially spaced baffles to deflect and uniformly distribute a sprayed fluid stream to a packed bed of contact material or catalyst within a treating chamber.

There are a multitude of processing operations which involve the contacting of a bed of catalyst, or other particulated material, with a liquid stream and it is not intended to limit the use of the present design and arrangement to any one process. For example, many chemical processing operations such as filtering, ion exchange, resin contacting, catalytic conversions, etc., utilize the flow of a liquid stream through a packed bed of particles. Also, in the petroleum field, there are various liquid-solids processing operations, in addition to catalytic conversions, such as in connection with a fractionation column using a packed bed, and in connection with the polymerization or alkylation of hydrocarbons in the presence of a liquid acid catalyst, where the combined streams pass over a packed bed of material.

One of the major problems involved in having a liquid stream contact a packed bed of material in a mixed phase operation is obtaining a uniform distribution of the liquid stream to the top or to the intermediate portion, of the contacting bed. The usual types of fluid inlet means or nozzles tend to deposit a major portion of the fluid stream to the center or to a side portion of the contact bed and thus actually initiate an uneven channeling through the bed.

It is a principal object of the present invention to provide improved distributing means which may be used at the upper end of a chamber having a bed of subdivided catalyst or a contact bed of inert particles, or in an intermediate zone thereof, in order to initiate uniform distribution of flow to such bed.

It is also an object of the present invention to provide a distributing nozzle and deflecting plate arrangement which intercepts a sprayed fluid stream in a manner to effect a substantially uniform proportioned distribution of such stream to the top of the contact bed.

Broadly, the present invention provides an improved liquid distributing apparatus for use in a particle containing treating chamber and comprises in combination, a transverse support plate adapted to extend across the interior of the treating chamber above at least a portion of the particle bed therein, a fluid distributing spray nozzle from a fluid inlet line positioned centrally with respect to the support plate and the bed in said chamber, such nozzle being constructed and arranged to spray liquid radially and uniformly therefrom in a full circular spray pattern that is substantially parallel with the support plate, a plurality of deflector plates being connected with and spaced in a symmetrical staggered pattern from one face of the support plate, the deflector plates in said staggered pattern being spaced both in a circumferential manner with respect to the centrally positioned nozzle and in a staggered manner with respect to one another in any radial direction from said nozzle, whereby the liquid being sprayed radially therefrom reaches the inward face of each deflector plate to in turn be uniformly deflected and distributed over the upper surface area of the particle bed therebelow within the chamber.

Each of the plurality of deflector plates, which are attached to and supported from the transverse supporting plate, are in each instance, positioned to intercept a radial line extending from the center of the unit in order that each plate has its maximum surface area facing inward to intercept the sprayed liquid stream from the nozzle. Also, it is preferable and substantially necessary that the staggered positioning or arrangement for the plurality of plates be such that no one plate of the group blocks the radially sprayed liquid stream from a next successive plate. Stated in another way, each plate of the plurality of plates in the pattern is positioned so that it can "see" the centrally positioned spray nozzle and receive its proportionate share of the sprayed stream to in turn downwardly deflect the liquid stream and cause distribution of proportioned shares to all parts of the upper surface of the contacting bed in the chamber.

The plurality of deflector plates, or baffle members, may depend from a transversely positioned supporting plate, with the inlet nozzle being positioned below the latter, or alternatively, the deflecting plates may project upwardly from the supporting plate, in which case the latter is positioned between the fluid inlet nozzle and the upper surface of the contact bed in the chamber. In the latter instance, it is of course necessary that the transverse supporting plate member be amply perforated to permit the deflected liquid stream to percolate therethrough uniformly to the contact bed therebelow. The spray nozzle will generally be placed a short spaced distance from the transverse plate and in a manner radially opposing the plurality of surrounding deflector plates such that a radially projected stream sprayed from the nozzle will intercept the variously spaced deflector plates across the entire horizontal area of the treating chamber.

Reference to the accompanying drawing and the following description thereof will serve to more clearly set forth the design and arrangement of the improved distributing system, as well as set forth further advantageous features in using the apparatus for liquid distribution to a solid particle contacting bed.

FIGURE 1 of the drawing is an elevational view, partially in section, indicating one embodiment of the fluid distributing apparatus.

Figure 2:
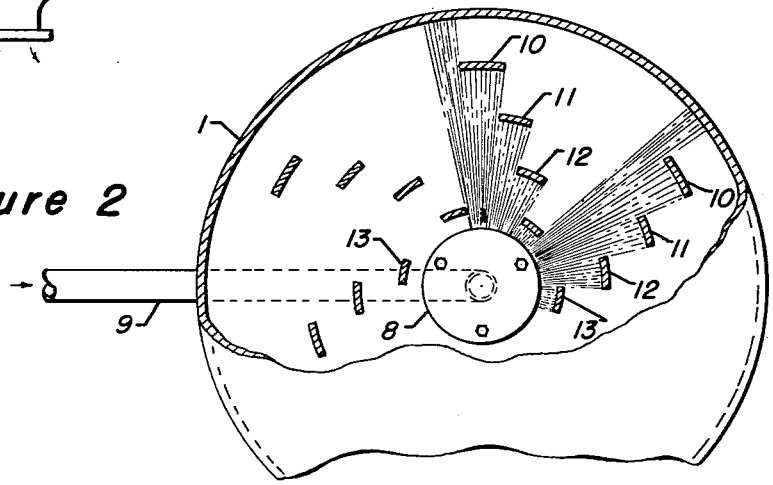

FIGURE 2 of the drawing is a partial sectional plan view, as indicated by the line 2—2 in FIGURE 1 of the drawing.

Figure 3:
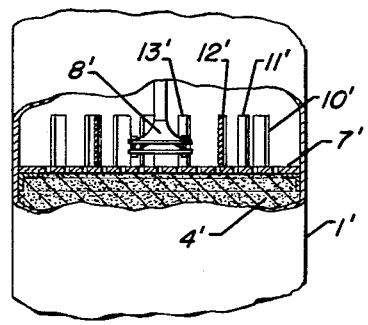

FIGURE 3 of the drawing shows in a partial sectional elevational view a modified position and arrangement of the transverse supporting plate member and the liquid distributing nozzle.

Referring now to FIGURES 1 and 2 of the drawing, there is indicated a suitable vessel or retaining chamber 1, having an upper fluid inlet 2 and a lower fluid outlet 3, that is adapted to hold a suitable particulated contact material. A lower portion of contact material 4 is supported on a suitable perforated supporting mean 5 within the lower end of the chamber 1 while an upper bed of material 6 is maintained above and supported by a transverse supporting plate 7. As set forth hereinbefore, it is not intended to limit the use of the present apparatus to any one type of particulated contact material or catalyst, or is it intended to limit the use of the apparatus to any one position in the contacting chamber. In other words, the fluid distributing means may be provided within the upper portion of the treating chamber entirely above any portion of the contact bed, or it may be utilized in an intermediate location within the contact bed as indicated in the present embodiment.

Below the support plate 7 and within an axial or central position, with respect to such plate and the interior of treating chamber 1, is a liquid distributing nozzle 8 that connnects with a liquid supply line 9. Various types of liquid distributing nozzles 8 may be utilized; however, in each instance, the nozzle is of a design providing radial distribution of the liquid therefrom around its entire periphery such that there is a resulting full circular spray pattern from the nozzle in a substantially horizontal manner. Further, the spray should be in a substantially uniform sheet that can reach the interior wall of the treating chamber 1 and not be confined to a circular pattern of less diameter than said chamber. Suitable pumping means, not shown, connective with line 9 or hydrostatic pressure in the liquid stream being introduced into the contacting zone through line 9, is of course required to be sure that the sprayed stream will have suitable velocity head to carry across the entire inner cross sectional area of the chamber.

As best shown in FIGURE 2 of the drawing, the arrangement of spaced, depending deflector plates of the present embodiment comprises a plurality of plates 10, plates 11, plate 12, and plates 13, each type of which may be considered as being in a concentric row, so that each type is substantially equidistant from the centrally positioned nozzle 8. Also, it should be noted that plates 11 are positioned such that they do not interfere with the radial spray of liquid to plates 10, while in a similar manner plates 12 are positioned in a staggered relationship with respect to plates 11 such that they do not interfere with the radial spray of liquid to plates 11. Similarly, plates 13 are staggered with respect to plates 12, such that in each instance, all of the plates of the apparatus are in a symmetrical pattern, staggered with respect to one another, whereby no one plate blocks the liquid being sprayed from the central nozzle from reaching an adjacent plate.

Still further, the width of the different types of plates in the different rows thereof are varied such that a greater quantity of the liquid being sprayed from the nozzle 8 will reach the outer annular portions of the upper surface area of the contact bed to in turn result in the fluid being distributed in a proportional manner. In other words, plates 10 are wider than plates 11, and the latter wider than plate 12, etc.

It is not intended to limit the consrtuction and arrangement to the use of any predetermined number of liquid deflecting plates, nor to any set number of rows of plates. Where it is desired to use a large number of plates, then it is necessary that the width of each of the individual plates be proportionately smaller to permit liquid being sprayed radially outwardly from the nozzle to reach the inner face of each of the individual plates. It is not necessary that each deflecting plate be actually vertical with respect to the transverse support plate 7 in the treating chamber, although such plates will be preferably in a substantially vertical position to efficiently intercept the laterally sprayed fluid stream. Also, as may be noted from the drawing, each deflecting plate is positioned at substantially right angles to a radial line projecting to the center thereof from the center nozzle 8, such that the inner face of each plate is effective in intercepting a maximum amount of sprayed liquid from the horizontal spray pattern.

In the staggered pattern arrangement of deflecting plates, it is also desirable that the outer row of plates 10 be spaced, with respect to next circumferentially adjacent plates to permit a proportioned part of the total liquid flow to reach the inside wall of chamber 1 to be deflected downwardly to an outer annular portion of the upper surface of the contact bed.

In FIGURE 3 of the drawing, there is shown a modified apparatus arrangement in which a perforate transverse supporting plate 7' is directly above a particle bed 4' within a vessel or chamber 1', and a liquid distributing nozzle 8' is positioned a short spaced distance above the plate 7'. In this arrangement the plurality of liquid baffles or deflecting plates project substantially vertically upward from the top face of the supporting plate 7' in a staggered pattern effecting uniform flow of the sprayed liquid stream to the top of the plate 7'. The staggered deflecting plates are indicated diagrammatically in the drawing as 10', 11', 12' and 13', with each plate being staggered with respect to another in a manner similar to the arrangement of FIGURE 2, so as to permit a proportioned flow of the liquid stream from the nozzle 8' to reach all successive annular segments of the supporting plate 7' and the upper surface of the contact bed 4'. Plate 7' is provided with sufficient perforate area to insure rapid flow of deflected liquid directly to the top of bed 4'.

It is, of course, unnecessary that the deflecting plates in any one embodiment be positioned in a concentric circular manner, as shown in FIGURE 2, inasmuch as each plate of the entire multiplicity of plates may be positioned at a different radial distance from the center of the apparatus. In fact, a greater number of deflector plates may be spaced at a distance from the nozzle, or closer to the inside wall of the treating chamber, as compared with plates near the center portion of the chamber, so that the width of deflector plates need not necessarily be different to provide a proportioned uniform flow of liquid to the top of the bed. However, generally, a continuous symmetrical pattern of plate positioning provides a desired resulting symmetrical flow pattern from the liquid distributing nozzle and a resulting uniformly proportioned liquid flow to the top of the contact bed.

Still other modifications may be made in connection with the improved apparatus construction and arrangement. As for example, a staggered arrangement of deflector plates may be provided to uniformly distribute liquid flow to an oval shaped, or rectangularly shaped, chamber to in turn provide a proportioned uniform liquid flow to the retained particle bed. With regard to the treating chamber itself, the arrangement of the inlet and outlet nozzles connecting therewith may be varied as to size and number depending upon the particular treating operation to be undertaken. In other words, the inlet port 2, as shown in FIGURE 1, may be omitted or positioned differently to suit a particular processing operation. Likewise, the vertical location and arrangement of inlet line 9 and distributing nozzle 8 in the contact chamber may be varied to accommodate a particular process.

Also, within the scope of the present invention, two or more liquid distributing units may be utilized in a single chamber, the number varying in accordance with the total quantity of particulated material to be contacted, and an effective bed depth which may be efficiently utilized between distribution zones without excessive channeling of the liquid stream.

I claim as my invention:

A contacting apparatus comprising in combination means forming a chamber, a fluid inlet at one end of the chamber and a fluid outlet at the opposite end thereof, a horizontal perforated plate extending across the interior of the chamber between said inlet and outlet, nozzle means disposed adjacent one face of said plate centrally with respect to the plate and chamber for spraying liquid radially and uniformly in a full circular spray pattern substantially parallel to said plate, a liquid supply line connected to said nozzle means, and a plurality of concentric rows of deflector plates extending substantially vertically from said face of said horizontal plate in the path of liquid spray from said nozzle means, said rows being circumferentially spaced around the nozzle means, the deflector plates of each of said rows being in staggered relationship with respect to the deflector plates of an adjacent row and each of said deflector plates being positioned at substantially right angles to a radial line projecting to the center thereof from the center of the nozzle means.

(References on following page)

References Cited in the file of this patent

UNITED STATES PATENTS

| | | |
|---|---|---|
| 2,494,067 | Snowden et al. | Jan. 10, 1950 |
| 2,639,947 | Tramm et al. | May 26, 1953 |
| 2,681,217 | Pennington et al. | June 15, 1954 |
| 3,016,234 | Huppmeier | Jan. 9, 1962 |
| 3,030,032 | Luhman | Apr. 17, 1962 |
| 3,034,730 | Pilo et al. | May 15, 1962 |
| 3,051,315 | Boester | Aug. 28, 1962 |

FOREIGN PATENTS

| | | |
|---|---|---|
| 11,269 | Great Britain | 1900 |
| 866,535 | Germany | Feb. 9, 1953 |

OTHER REFERENCES

"Support Plates, Distributors, and Hold-Down Plates for Packed Towers," Design Manual TA–4OR, U.S. Stoneware Co., Akron 9, Ohio, copyright 1960, pages 2 and 16.